United States Patent

Nagasawa et al.

[11] 3,925,244
[45] Dec. 9, 1975

[54] AUTOMATIC CONTROL DEVICE FOR CAR LIGHTING

[75] Inventors: Mashahiro Nagasawa; Hiroyuki Watanabe, both of Hirakata; Takashi Wakabayashi, Ibaraki, all of Japan

[73] Assignee: Matsushita Electric Industrial Co., Ltd., Osaka, Japan

[22] Filed: Apr. 25, 1974

[21] Appl. No.: 464,618

[30] Foreign Application Priority Data
Oct. 19, 1973 Japan.......................... 48-118205

[52] U.S. Cl. .................. 250/372; 315/77; 315/82
[51] Int. Cl.² .......................................... G01J 1/42
[58] Field of Search ................ 250/372; 315/77, 82

[56] References Cited
UNITED STATES PATENTS

| | | | |
|---|---|---|---|
| 3,591,825 | 7/1971 | Keighley, Jr. | 315/82 |
| 3,659,157 | 4/1972 | Nagasawa | 250/372 |
| 3,805,124 | 4/1974 | Nagasawa et al. | 250/372 X |
| 3,821,593 | 6/1974 | Roselli | 315/82 |

*Primary Examiner*—Archie R. Borchelt
*Attorney, Agent, or Firm*—Wenderoth, Lind & Ponack

[57] ABSTRACT

An automatic control device for car lighting has an ultraviolet detector which is a stannic oxide photoconductive device, a signal detecting circuit, a switching circuit and lamps. When the amount of visible light in the sun light decreases, the amount of ultraviolet light also decreases and the detector generates a signal through the detecting circuit, and by the signal the switching circuit turns the lamps on automatically without being disturbed by artificial light which contains substantially no ultraviolet light.

3 Claims, 4 Drawing Figures

AUTOMATIC CONTROL DEVICE FOR CAR LIGHTING

BACKGROUND OF THE INVENTION

This invention relates to an automatic control device for car lighting, and more especially to an automatic control device for car lighting for automatically switching car lights on and off according to the ambient brightness.

Various automatic devices have been used in a car for reducing the burden on the driver and assuring safe driving. For various lights such as the headlights, the tail lights and the number-plate light, conventionally these lights are switched on or off by manual operation by the driver. Although it is not troublesome for the driver to switch the lights on if they are required only when it becomes dark at evening, because there have recently been many roads constructed having many tunnels, the driver must often switch the lights on and off while driving a car on such roads. This is rather troublesome for the driver, and sometimes it causes an accident.

There are known some devices for automatically turning on the lights according to the ambient brightness by using a detector of visible light or near-infrared light, and such a device is used for a light such as an all-night light.

However, in the conventional automatic lighting device, because it is difficult to distinguish the sunlight from artificial light, such a device is not suitable for an automatic lighting device for a car. That is, if the conventional automatic lighting device is used for a car, undesirable erroneous operation occurs, i.e., that the lights are erroneously put out owing to detection of the head light of an oncoming car or of a succeeding car at night and the lights are erroneously not turned on in a tunnel due to detection of the artificial tunnel lighting.

SUMMARY OF THE INVENTION

Therefore, an object of the present invention is to provide a novel and improved automatic control device for car lighting which provides sure operation at the desired time.

Another object of the invention is to provide a novel automatic control device for car lighting for automatically switching the car lights off and on according to the ambient brightness without the influence of artificial lighting.

A further object of the invention is to provide a novel automatic control device for car lighting using as an ultra-violet light detector a stannic oxide photoconductive device.

These objects are achieved by providing an automatic control device for car lighting according to the present invention, which comprises a detecting means for selectively detecting ultraviolet light, said detecting means consisting of a stannic oxide photoconductive device, a signal detecting circuit connected to said detecting means, said signal detecting circuit generating an output signal when said detecting means receives ultraviolet light in an amount of more than a certain value, a switching means connected to said signal detecting circuit, said switching means operating according to the output signal from said signal detecting circuit, and a lighting means connected to said switching means, whereby said lighting means is automatically switched on or off according to the amount of ultraviolet light detected by said detecting means.

DETAILED DESCRIPTION OF THE INVENTION

According to the inventor's investigations, it is known that the amount of ultraviolet light, especially near ultra-violet light of a comparatively long wave length of 3,200 to 3,600 A, in the sun light near the surface of the earth changes greatly according to the altitude of the sun, i.e. the time of day, weather, existence of shade, etc., and the increase or decrease of that amount of ultraviolet light is almost the same as the increase or decrease of the visible light in the same sun light. Therefore, by detecting the amount of near ultraviolet light in a range from 3200 to 3600A, the level of the brightness of the visible light can be detected.

Recently, various kinds of artificial light sources have been developed and used practically. But, generally the amount of ultraviolet light emitted from these artificial light sources is much less than the amount of the ultraviolet light contained in sun light. Especially, the amount of light having a wave length less than 3600A is very small. Therefore, it is possible to detect substantially only sun light as distinguished from other artificial light by using a detecting device which does not respond to the visible light and responds sharply to ultraviolet light, especially to near ultraviolet light of a wave length of 3200 to 3600A.

The present invention is based on the consideretion described above, and according to the invention there is provided an automatic control device for car lighting which operates with certainty so as to turn the car lights on without being distrubed by light for road illumination, light from oncoming cars, etc., when amount of the sun light decreases below a predetermined amount by employing a detector which selectively detects ultraviolet light, especially near ultraviolet light of 3200 to 3600A. In the following, an embodiment of the invention is described in detail.

Figure 1:
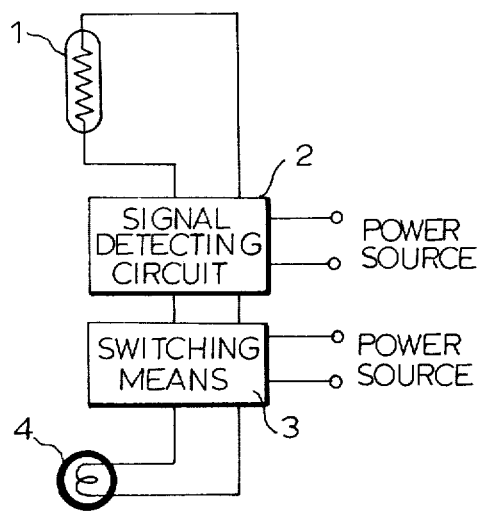
FIG. 1 is a block diagram of an automatic control device for car lighting according to the invention.

FIG. 1 is a block diagram of an automatic control device for car lighting according to the invention, in which the reference numeral 1 designates a detecting means which does not respond to visible light and infrared light and detects selectively only ultraviolet light. The detecting means 1 is connected to a signal detecting circuit 2, and the signal detecting circuit 2 is connected to a switching means 3. A car light 4 is connected to the output of the switching means 3. When the ultraviolet light in an amount higher than a predetermined level is detected by the detecting means 1, the signal detecting circuit 2 generates a large output signal, and by that signal the switching means is kept open. Therefore, the light 4 is not turned on. When the amount of ultraviolet light detected by the detecting means decreases below the predetermined level, the output of the signal detecting circuit 2 also decreases and the switching means is closed. Then, the light 4 is turned on, and it is not turned off until the detecting means detects an amount of ultraviolet light higher than the predetermined level.

With the detecting means 1, it is necessary to selectively detect only ultraviolet light, especially light of 3200 to 3600A, without responding to visible light and the infrared light. It is desirable to use, for example, an ultraviolet photoconductive cell disclosed in U.S. Pat. No. 3,805,124 by the present inventors. That is, the cell has a stannic oxide body which is doped with an acceptor impurity and two electrodes applied to one surface of the stannic oxide body. Such a stannic oxide photoconductive device has a high sensitivity in a narrow band of ultraviolet light with the center of the wave lengths being 3400 to 3450A and no sensitivity to visible light. Therefore, the device can be advantageously applied to the invention directly without use of light filtering means. Further, the device has the advantages that it is strong with respect to vibration since it is solid state device, that it has a long life, and that it can be directly driven by the conventional car battery, without the need for a special power source.

For the signal detecting circuit 2, there may be used various circuits such as a Schmidt trigger circuit depending on the characteristics of the stannic oxide photoconductive device which is used. Sometimes, an amplifier is added to the signal detecting circuit. Also, for the switching means 3, various types can be used such as a conventional electromagnetic relay, or a semiconductor device as a thyristor or triac. The car light 4 is representative of the head lights, tail lights, number-plate light, etc. which should be put on during driving at night or in a tunnel.

Figure 2:
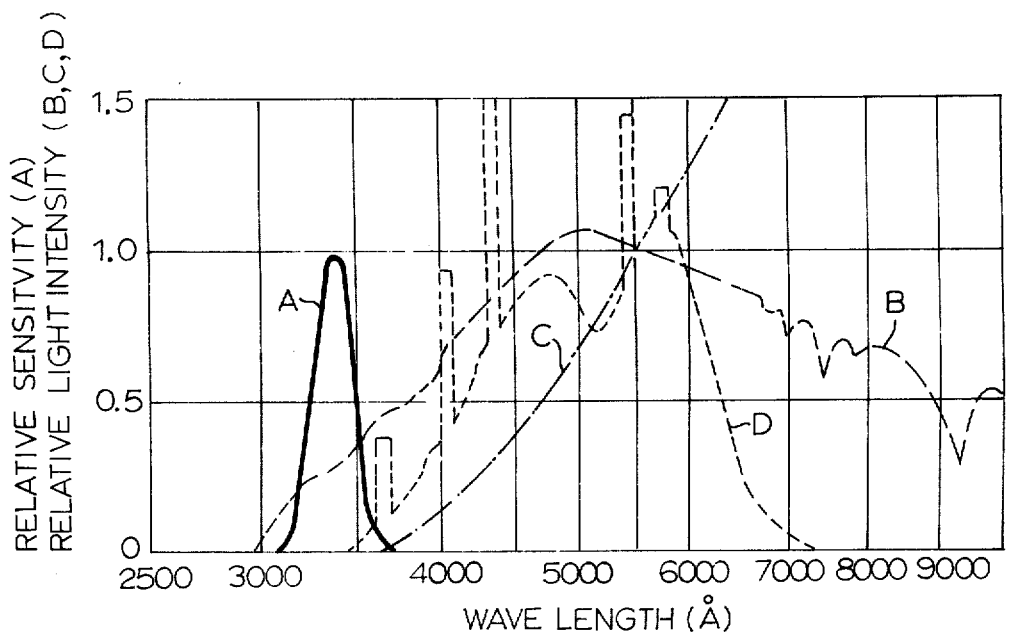
FIG. 2 shows the spectra of various lights and the spectrum of the detecting sensitivity of the detecting means used in FIG. 1 for explanation of the effect of the device of the invention.

The spectrum of the sensitivity of the stannic oxide photoconductive device used in the invention is shown by the curve A in FIG. 2. As is obvious from FIG. 2, the device has a narrow and sharp characteristic of the sensitivity. The curves B, C and D in FIG. 2 show the spectrum of the relative light intensity of sun light, incandescent lamp and a day light fluorescent lamp, respectively. These curves are normalized at the wave length of 5500A where the luminosity factor of the human eye becomes a maximum. As understood from FIG. 2, the sun light of the curve B contains a considerable amount of near ultraviolet light, but the amount of near ultraviolet light emitted from the artificial light sources, especially ultraviolet light of a wave length less than 3600A, is very small. Accordingly, the control device of the invention can operate surely in accordance with the brightness of the sun light, without being disturbed by artificial light, by detecting selectively only ultraviolet light. Particularly as shown by the curve C in FIG. 2, there is substantially no ultraviolet light emitted from the incandescent lamp, so that there is practically no erroneous operation of the device of the invention due to the head lights of oncoming cars or succeeding cars. Although some of the artificial lights such as a fluorescent lamp (the curve D) and a high pressure mercury-vapor lamp (not shown) contain a little near ultraviolet light, the possibility of erroneous operation, which may be caused on receiving such artificial light from a short distance away, can be practically eliminated by installing the detecting means suitably as described hereinafter with reference to FIGS. 3 and 4. There is light of a wave length of less than 3200A in sun light, but because the increase and decrease of this light does not always correspond to that of the visible light in the sun light, it is not desirable to use the light in this area for automatically lighting by means of the device of the invention.

Figure 3:
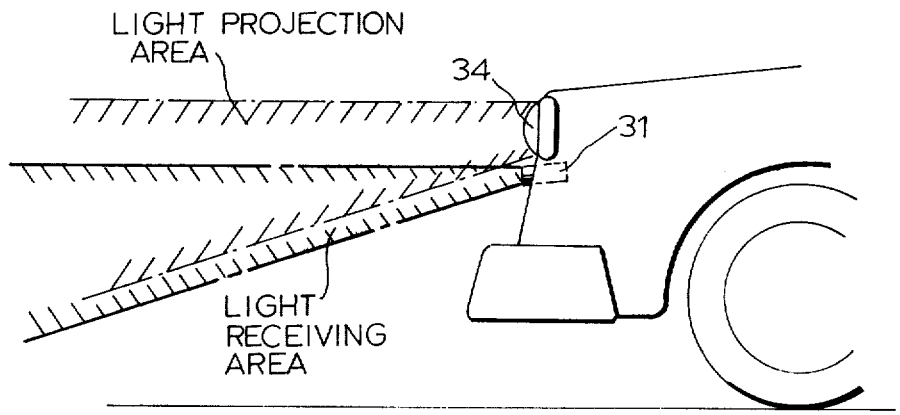
FIG. 3 is a side view of the front portion of a car on which the device of the invention is installed.
Figure 4:
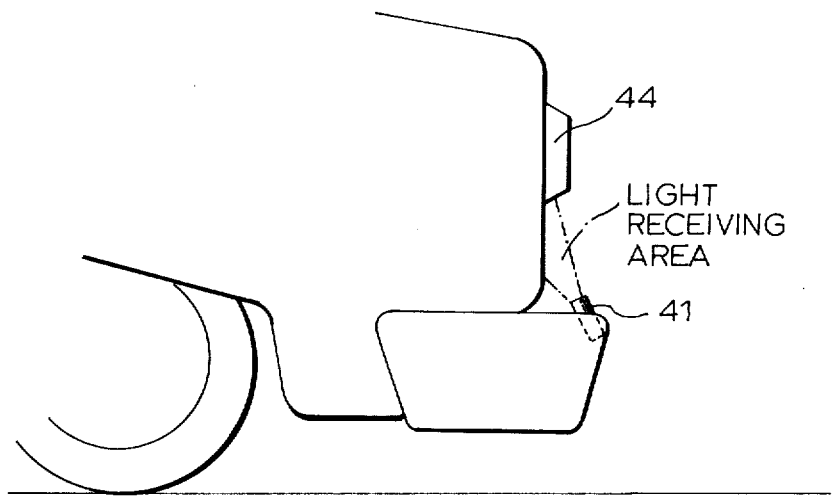
FIG. 4 is a side view of the back portion of a car on which the device of the invention is installed.

FIGS. 3 and 4 show the desirable position on a vehicle at which the detecting means of the device of the invention is to be installed. FIG. 3 is a side view of the front portion of a car. As the head light 34 is usually arranged so as to illuminate the road 30 to 100m ahead, in order to control the lighting of this head light 34 automatically, it is desirable to arrange the detector 31 so as also to receive the light from the road 30 to 100m ahead, as shown in FIG. 3. When the brightness of the sun light on the road in front of the vehicle decreases to a level less than a predetermined level at sunset, the head light 34 is automatically turned on. Although in this case the detector 31 receives light from the head light 34 indirectly, the detector does not operate erroneously because the light from the head light 34 does not contain any substantial amount of ultraviolet light, as described hereinbefore. Also, there is no erroneous operation due to light from the head lights of an oncoming car for the same reason. When the car goes to a place where the sun light does not shine such as a tunnel, the light 34 is turned on automatically even in daytime, and at the exit of the tunnel the light 34 is again turned off automatically. Also in this case because the artificial illuminating light in the tunnel does not contain a substantial amount of ultraviolet light, there is no erroneous operation.

In the arrangement of FIG. 3, the back lights such as the tail lamps and the number-plate lamp may be connected to the detector 31. However, because the back light is an indication for the driver of the succeeding car, it is desirable to operate the back light according to the brightness at of the back side of the car. FIG. 4 is a side view of the back portion of a car, showing an example of a desirable position where the detector 41 can be mounted for automatically controlling lighting of the tail lamp 44. The detector 41 detects the brightness in the vicinity of the tail lamp 44. When the brightness of the sun light at the back of the car decreases below a predetermined level, the lamp 44 is automatically put on. Similarly to the above described case, there is no erroneous operation even if the detector receives light from lamp 44, since such light does not contain any substantial amount of ultraviolet light, which is the only light to which the detector 41 responds. Also, the detector 41 does not operate erroneously due to the head lights from a succeeding car. It is also possible to arrange the detector 41 toward the number-plate or on the road at the back.

There may be provided various modifications in the device of the invention. For example, by using more than two output signals of differently set levels from a single detector, it becomes possible to change the time of putting on the head lights, tail lamp and number-plate lamp. The level of the signal from the detector, at which the device of the invention operates so as to automatically turns lights on and off, can be arranged in a conventional manner.

What is claimed is:

1. An automatic control device for car lighting having a detecting means and circuit means for providing an electric signal in response to a signal from the detecting means for switching a lighting means on or off, characterized in that said detecting means consists of a stannic oxide photoconductive device for selectively detecting ultraviolet light having a wavelength in the range of 3200 to 3600A so that said lighting means is automatically switched on or off according to the amount of ultraviolet light detected by said detecting means.

2. An automatic control device for car lighting as claimed in claim 1, wherein said detecting means is positioned near a head light of the car so as to detect the intensity of ultraviolet light at a place which is substantially the same as the place lighted by said head light.

3. An automatic control device for car lighting as claimed in claim 1, wherein said detecting means is positioned near a back light of the car so as to detect the intensity of ultraviolet light at a place in the vicinity of said back light.

* * * * *